US008880809B2

(12) United States Patent
Loh et al.

(10) Patent No.: US 8,880,809 B2
(45) Date of Patent: Nov. 4, 2014

(54) MEMORY CONTROLLER WITH INTER-CORE INTERFERENCE DETECTION

(71) Applicant: Advanced Micro Devices, Inc., Sunnyvale, CA (US)

(72) Inventors: Gabriel Loh, Bellevue, WA (US); James O'Connor, Austin, TX (US)

(73) Assignee: Advanced Micro Devices Inc., Sunnyvale, CA (US)

( * ) Notice: Subject to any disclaimer, the term of this patent is extended or adjusted under 35 U.S.C. 154(b) by 186 days.

(21) Appl. No.: 13/663,335

(22) Filed: Oct. 29, 2012

(65) Prior Publication Data

US 2014/0122801 A1 May 1, 2014

(51) Int. Cl.
*G06F 13/00* (2006.01)

(52) U.S. Cl.
USPC ............. 711/147; 711/118; 711/156; 712/10; 712/16; 712/225

(58) Field of Classification Search
USPC ............... 711/118, 147, 156; 712/10, 16, 225
See application file for complete search history.

(56) References Cited

U.S. PATENT DOCUMENTS 8,078,483 B1* 12/2011 Hirose et al. ...................... 705/5
2012/0084165 A1* 4/2012 Hirose et al. .................. 705/26.1

* cited by examiner

*Primary Examiner* — Reba I Elmore
(74) *Attorney, Agent, or Firm* — Staniford Tomita LLP

(57) ABSTRACT

Embodiments are described for a method for controlling access to memory in a processor-based system comprising monitoring a number of interference events, such as bank contentions, bus contentions, row-buffer conflicts, and increased write-to-read turnaround time caused by a first core in the processor-based system that causes a delay in access to the memory by a second core in the processor-based system; deriving a control signal based on the number of interference events; and transmitting the control signal to one or more resources of the processor-based system to reduce the number of interference events from an original number of interference events.

20 Claims, 5 Drawing Sheets

MEMORY CONTROLLER WITH INTER-CORE INTERFERENCE DETECTION

FIELD OF THE INVENTION

One or more implementations relate generally to memory controller circuits, and more specifically to reducing inter-core interference during memory access operations.

BACKGROUND

Modern computer systems typically employ multi-core processors that have two or more independent processing cores that read and execute program instructions. Multi-core processors are often used in systems that feature shared memory resources. Shared memory is often implemented as a large block of random access memory that can be accessed simultaneously by several different processing units or cores in a multi-processor system. Shared memory is used to provide efficient communication among the different processing units and helps prevent the need to make redundant copies of data since all processors share a single view of the data stored in the shared memory.

Memory controllers handle and service requests from multiple sources (e.g., multiple cores, processors, co-processors, and so on) to the shared memory, and these individual request streams can interfere with each other, such that certain requests are blocked while the controller is busy servicing other requests. Various different types of interference conditions are possible and common examples of interference include bank contention (e.g., a request from core 0 must wait because the target bank is busy servicing a request from core 1) and row-buffer conflicts (e.g., core 1 must close a row buffer corresponding to a page opened by core 0).

Various different solutions have been developed to try to reduce the effect of interference in shared memory systems. For example, existing memory control algorithms may attempt to improve fairness and quality of service (QoS) by monitoring high-level metrics such as a core's memory request rate, or differentiating between different processor (e.g., CPU vs. GPU) memory streams, and then accounting for these differences in its scheduling decisions, such as by changing priorities of the streams. However, these approaches use high-level metrics that essentially focus only on bandwidth utilization or metrics that are tied to bandwidth utilization. For example, existing solutions may attempt to distribute memory resources evenly to the cores based on bandwidth capacity as a way to ensure fairness. Such methods, however, do not account for the actual needs of the different cores, nor do they account for the impact that memory usage by certain cores has on the other cores. Other high level metrics, such as a high request rate by a particular core may be suggestive of higher contention, but it does not necessarily imply such a case. For example, a high request rate isolated to one or a few banks may cause fewer row-buffer conflicts than requests with a lower request rate distributed across all of the banks. Most current systems do not explicitly monitor the lower-level behavior of the memory requests at the bank-utilization or row-buffer conflict level, and this information is typically much more useful in identifying particular contention problems, associating problems with specific elements, and providing indications of optimal solutions to the problems than the common high level metrics and bandwidth oriented approaches. Although some prior approaches to interference issues have considered certain finer-grained metrics, they generally do not consider the direct interaction between cores. For example, Thread Cluster Memory (TCM) scheduling systems monitor bank-level parallelism (BLP) per core, but do not track whether or how a higher level of BLP impacts the performance of other cores in the processor.

Furthermore, memory controllers typically do not have a way to track how much interference is caused by the various cores in the system, and thus their ability to take these effects into account when scheduling memory requests is limited or non-existent. To the extent that memory usage is tracked, present solutions generally limit the usage of any tracked information to the memory scheduler itself. The memory scheduler may make different decisions based on the tracked information, but the rest of the system is oblivious to any contention and interference issues in the memory controller and main memory. This can result in poor memory scheduling decisions leading to reduced performance, reduced throughput, reduced fairness/QoS, and possibly increased power consumption/decreased energy efficiency.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY OF EMBODIMENTS

Some embodiments are directed to a method for controlling access to memory in a processor-based system, the method comprising monitoring a number of interference events caused by a first core in the processor-based system that causes a delay in access to the memory by a second core in the processor-based system, deriving a control signal based on the number of interference events, and transmitting the control signal to one or more resources of the processor-based system to reduce the number of interference events from an original number of interference events.

Some embodiments are directed to a method for attributing cross-core interference for memory accesses to specific cores in a processor-based system, the method comprising maintaining a count of the interference events in a plurality of counters associated with one or more memory access conditions, the interference events being associated with a first core in the processor-based system that impact access to the memory by a second core in the processor-based system, and transmitting a control signal to one or more resources of the processor-based system to reduce the number of interference events to a number less than an original number of interference events.

Some embodiments are directed to a system for controlling access to memory in a processor-based system, the system comprising an interference monitor configured to monitor a number of interference events caused by a first core in the processor-based system that causes a delay in access to the memory by a second core in the processor-based system, and a counter component configured to generate a control signal based on the number of interference events and transmit the control signal to one or more resources of the processor-based system to reduce the number of interference events from an original number of interference events.

BRIEF DESCRIPTION OF THE DRAWINGS

In the following drawings like reference numbers are used to refer to like elements. Although the following figures

DETAILED DESCRIPTION

Embodiments are generally directed to logic circuitry in a memory controller that monitors and tracks interference between cores of a multi-core processor, or processing components in a multi-processor system that accesses shared memory through the memory controller. Components of the system include circuit elements that track interference in memory accesses among the different cores (tracking logic), and circuit elements that utilize the tracked information to modify the behavior of system components (control logic) to help optimize scheduling decisions. Embodiments are further directed to methods of implementing a memory controller through logic that can detect cross-core interference and provide control signals that can be used by the memory controller to optimize scheduling decisions, such as by increasing fairness and quality of service in memory access operations. Embodiments include a method that uses low-level information to provide better memory usage and interference information to help improve scheduling decisions, and that exposes this contention information (or derivative values of this information) to other parts of the system including the memory controller itself, the main memory, the cache memory, individual cores in the processor, the executed software, and other relevant resources in the system.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
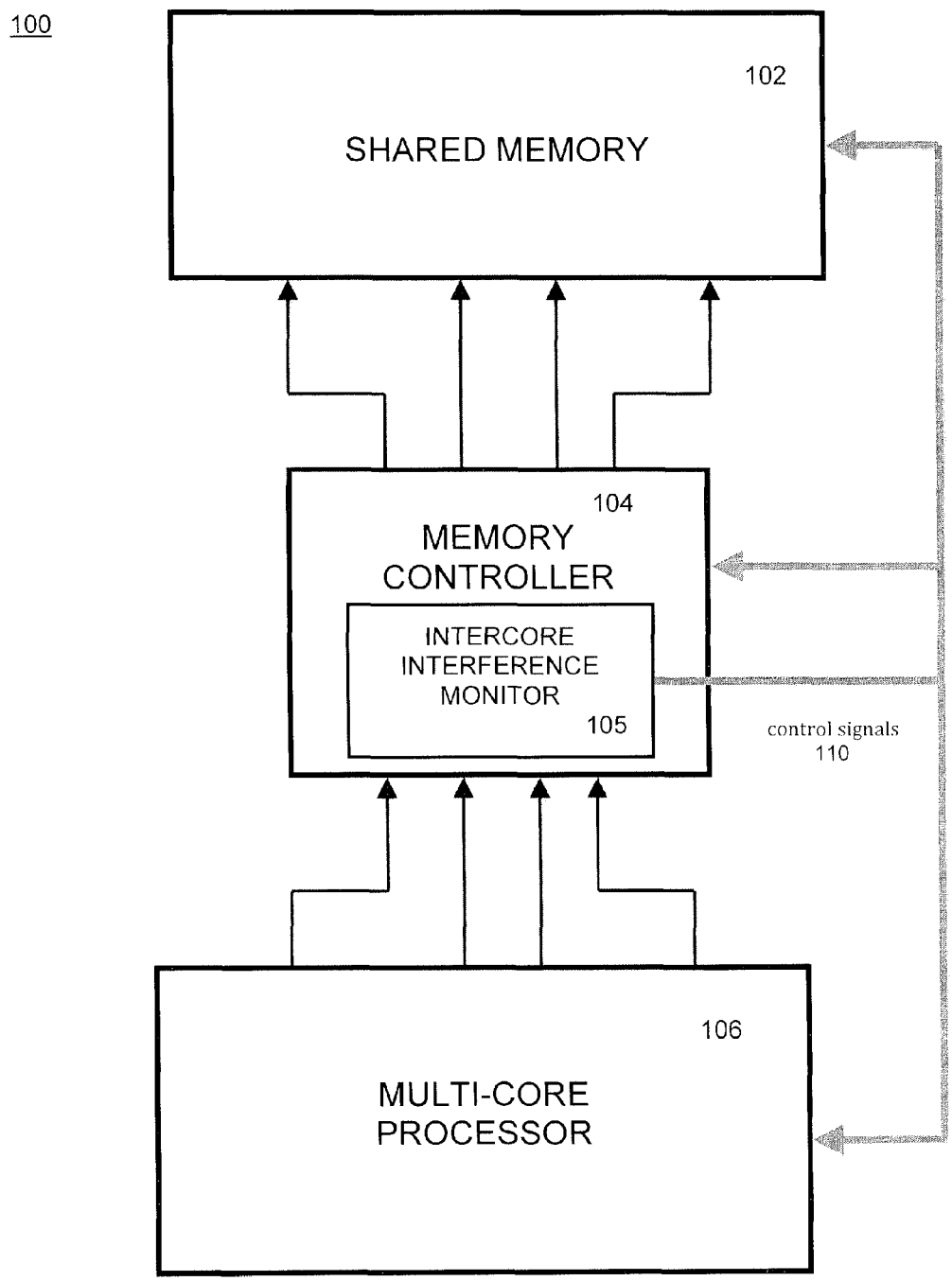
FIG. 1 illustrates a memory controller in a multi-core processing system that implements an intercore interference monitor, under some embodiments.

FIG. 1 illustrates a memory controller in a multi-core processing system that implements an intercore interference monitor, under some embodiments. As shown in system 100 of FIG. 1, shared memory 102 is accessed by multiple resources in the system, such as program threads executed by multi-core processor 106. Memory controller 104 serves memory access requests from one or more of the cores of multi-core processor 106 to the shared memory 102. Memory controller 104 includes an intercore interference monitor 105 that detects instances of cross-core interference. The detection of any such interference is then used to provide control signals or similar commands that are used by the memory controller to optimize scheduling decisions (e.g., to increase fairness and quality of service) or by the other system components (e.g., the cores, cache memory, or the software) to modify behavior to alleviate or eliminate the interference. The intercore interference monitor 105 may be implemented as circuitry, logic, firmware or similar mechanisms that track interference between the cores that access memory through the memory controller 104. The intercore interference monitor 105 is configured to track or monitor several different types or conditions of intercore interference, including bank contention, row conflicts, bus contention, and/or write-to-read turnaround time. Other similar interference conditions may also be tracked by the intercore interference monitor 105.

In some implementations, the shared memory 102 comprises a DRAM (dynamic random access memory) structure that is organized as arrays of bitcells in which each two dimensional array constitutes a bank. Each bank can be further organized into ranks and channels, or other subunits of memory. Reading or writing data to the DRAM requires that a row of bitcells from the array to be read into a row buffer, and the read/write operations operate directly on the row buffer. Accessing data from the row buffer is generally faster than opening the corresponding row from the DRAM array, and writing data to the array causes the row buffer to be closed. The memory controller 104 coordinates the opening, reading, writing and closing of rows. It also enforces the timing constraints required by the DRAM devices, such as limiting the rate of page-open operations and ensuring a minimum amount of time between writes and reads (WTR time). The memory controller also schedules commands such that each command and data bus for each channel is used by only one bank at a time. The memory controller schedules requests to optimize parallel operations of the multiple banks and maximize row buffer hits, as well as implementing other measures to provide fairness among the cores of processor 106.

In some embodiments, the intercore interference monitor 105 includes or is coupled to one or more counter elements that count and store tracking information related to interference events caused by and/or suffered by individual cores of the multi-core processors. This allows the memory controller to track how often specific cores delay memory accesses by other cores, or how often specific cores are delayed by other cores. This mechanism allows the system to essentially attribute blame to particular cores if they are responsible for specific instances of interference. In some embodiments, each core is tracked with a counter or similar structure that keeps track of the number of interference events on a per-cycle basis. The count is incremented by each delay caused or suffered by a core. The incremented count value represents a score that provides an indication of the degree of interference caused or suffered by that particular core.

A second part of the intercore interference monitor 104 comprises a control circuit that utilizes the count or score information to modify or cause the modification of the behavior of one or more system components. Once an interference condition is detected as caused by any of the above-listed conditions, the intercore interference monitor 105 issues control signals 110 that may be used by the memory controller and/or other components of system 100 to eliminate or reduce the cause of the interference. The control signals 110 can be used to control or modify the service delivered to the interfering cores by controlling one or more components of the system, such as the memory controller 104, cache memory (shared or private), processor cores, and the software. Other resources of the system may also be controlled by the control signals 110 from the intercore interference monitor 105.

Interference Conditions

As stated above, the intercore interference monitor 105 monitors several different aspects of intercore interference, and maintains a set of counters that keep track of the number of interference events associated with each core. In some embodiments, the tracked interference events include bank contention, row-buffer conflicts, bus contention, and/or write-to-read turnaround time, among other possible interference events.

With regard to bank contention, the memory controller stores data regarding which core is currently accessing each bank of memory. A counter (or similar data structure) is configured such that every bank keeps track of busy conditions caused by each core. In some embodiments, a separate counter is maintained for each core, and is incremented for each contention on a per-cycle basis. If a request from a first core could have otherwise issued a command but the bank is busy and the bank is servicing a request from a different core, a saturating counter is incremented for the second core to indicate that it is causing contention for others. This embodiment essentially counts interferences caused by "offending" or "interfering" cores.

In some embodiments, a counter for the blocked core is incremented. Thus, in the case of the example above, the counter for the first core can be incremented to indicate that its service request was blocked because of activity by a different core. This mechanism tracks cores that are victims of interference, rather than causes of interference. These embodiments thus essentially counts interferences suffered by "victimized" cores. In some embodiments, counters for both interfering and victimized cores are incremented for each interference event.

Depending on implementation details, certain commands may be excluded from being recognized as constituting an interfering event. For example, a precharge can be excluded because the request that was prevented from issuing a command would have likely needed to issue a precharge anyway.

With regard to row-buffer conflicts, as stated above, each DRAM bank has a row-buffer that provides access to a page that is open at a bank. To perform a read operation, the page containing the memory location is opened and read into the row buffer so that the row buffer stores an entire page at a time. A row buffer hit comprises an access to a page that is presently in the row buffer. However, if an access to another row arrives, the current row must be closed and the new row must be opened before the request can be serviced. This causes a row-buffer conflict and can result in substantial delay in DRAM, such as on the order of up to three times as many processor cycles as a row buffer hit.

To address the impact of row-buffer conflicts, the monitor maintains a counter per core and tracks row conflicts for each core that is due to the activity of another core. For each core/bank pair, the monitor tracks the most recently opened page (include closed page state), as well as which core is responsible for having closed that page. The monitor can also be configured to track the opening or reading/writing of any new conflicting page, as any of the cores of the processor could have caused a page closing. If the core has a read/write request that would have been a row-buffer hit, the counters of any cores responsible for having caused the page to be closed are incremented. To illustrate the use of such a counter, consider the following example: core 0 opens row A, core 1 then closes row A, and core 0 attempts to access row A again. In this case the interfering action of core 1 prevents a row buffer hit for core 0 since it closed row A between the second request for the same page by core 0. The counter for core 1 would thus be incremented to reflect this row conflict interference. Alternatively or additionally, a counter for core 0 could be incremented to reflect that it suffered a row conflict interference by another core.

In certain cases, two requests by a core may not result in row buffer hits. In this case, interference by a different core does not necessarily result in row conflict with the first core. Thus, a single core may issue requests that themselves cause a row buffer conflict, and this should not be attributed to another possibly interfering core. In some embodiments, to account for improper attribution of fault to different cores, the monitor also maintains a state register for each core per bank of memory to store the state that would have existed if a particular row buffer operation were not interfered with. Consider the example above with a slight change: core 0 opens row A, core 1 then closes row A, and core 0 attempts to open row B (instead of row A). In this case, the action of core 1 interfered with core 0, but since core 0 is accessing a different row in its two consecutive requests, a row buffer hit would not have occurred anyway. In this case, no row-buffer interference should be indicated (though there could still exist some other kind of interference) and the counter for core 1 is not incremented. The state register stores information regarding the requested row by a core before and after the interfering action by a different core. If the requested row is the same, then the interference is counted against the other core. If the requested row is different, then the interference is not counted against the other core. In some embodiments, one state register is provided per core per bank. Thus in a system with four cores and eight banks, 32 registers would be required. The size of each state register depends on the size of a bank. Thus, for example, if a bank comprises 1024 rows, each register would be a 10-bit wide register.

The third type of interference event tracked by the intercore interference monitor 105 is a bus contention. The memory controller tracks individual cores that transmit commands and/or data over the bus. Bus contention occurs when two or more cores try to use the same bus at the same time. In this case a core can be delayed by the bus activity of another core that is sending or receiving data or commands. In some embodiments, for bus contentions, the monitor maintains a counter per bus per core, and tracks bus contention for each core that is due to the activity of another core. The counters are incremented per bus per cycle of bus usage. The longer (in terms of cycles) that a core utilizes the bus, the greater the count is incremented. In some alternative embodiments, the counter is not necessarily incremented on a per-cycle basis on every cycle, but instead a sample may be taken at periodic intervals to determine if and by which core the bus is being utilized. In either case, when the bus is being used, the monitor tracks which core is responsible for the current utilization. If this use is preventing another core from using the bus, the interfering core's counter is incremented.

The write-to-read (WTR) turn around time ($t_{WTR}$) measures the delay that is caused by a core that sends data and then switches to receive data over the bus. This incurs a forced delay to clear the pipeline and reset the circuitry to change direction. During this delay period, the bus is busy and cannot be used. One example situation in which potentially significant delays can be introduced is when one core writes frequently and another core reads frequently the bus must switch back and forth at a high rate when these two cores try to access the bus at the same time. In this case, it does not matter which address or which memory is accessed, but rather that the bus is forced to switch between a write (to anywhere) and a read (from anywhere). For this type of contention, the write operations stall out the reads, so that the reads are delayed. Thus, the writing core is considered to be the interfering core. In some embodiments, for the WTR turn around time, the monitor maintains a counter per core that is incremented on a per-cycle basis when a particular core issues write commands that delay another core's read commands due to the WTR turn around time of the bus. This counter thus tracks when the data bus is unavailable due to a recent write on the bus (i.e., the memory system must wait for $t_{WTR}$ to elapse for the data bus write-to-read turn-around) and this prevents a read from issuing from another core. The counter corresponding to the core that last issued a write is incremented.

The embodiments described above describe cases in which the action of an interfering core is being tracked. In some embodiments, counters (or similar data structures) are used to track victimized cores, that is, cores that are disadvantaged due to interference by other cores. For this victimization case, instead of incrementing the counter corresponding to a core that is causing contention/interference, a counter for the core that is being prevented from issuing a command is incremented. Implementations may include one or both types of counters (i.e., counters for tracking cores causing contention and/or counters for tracking cores suffering from contention).

In general, any memory timing constraint, other than the four explicitly listed interference conditions, where the action of one core may delay the issuing of commands by other cores can be tracked. The count values for the various interference conditions form a score for each core with respect to how offensive or victimized a particular core is. Cores with sufficiently high counter values may be deemed to be interfering with other cores. Multiple counters corresponding to multiple types of interference/contention may be used. A defined threshold score may be defined for each interference condition to help define when a particular counter is an interfering core or a victimized core, such that control should be taken to eliminate or reduce the interference caused or suffered by the core. Such a threshold score can be a metric that is derived by theoretical or observed operation of the memory system, and can be defined separately for each type of interference condition as well as the capabilities and properties of the memory system.

Figure 2:
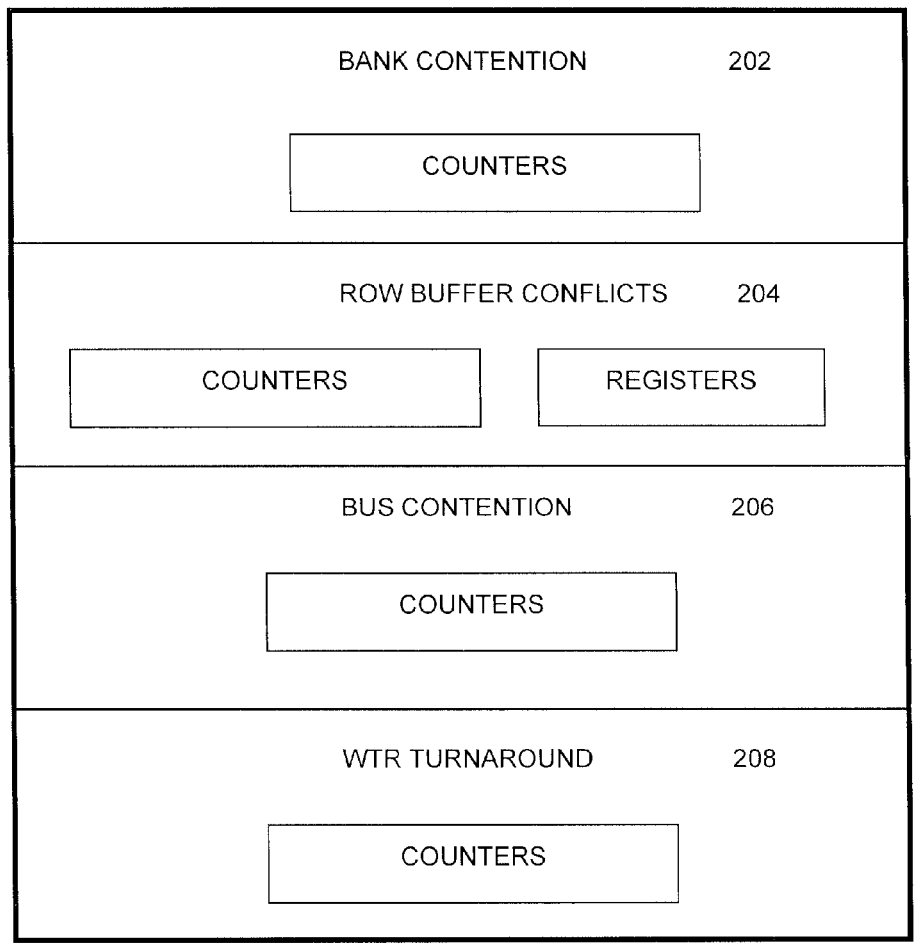
FIG. 2 is a diagram of an intercore interference monitor circuit for use in a multi-core processing system, under some embodiments.

FIG. 2 is a diagram of an intercore interference monitor component for use in a multi-core processing system, under some embodiments. As shown in diagram 200, the monitor component comprises four separate sections, one for each type of interference condition: bank contention 202, row-buffer conflicts 204, bus contention 206, and WTR turn-around time 208. Each section has a set of counters, with one counter per core. The row conflicts section 204 also includes a set of state registers. The physical size and configuration of the counters and registers can be selected as appropriate for the particular processor and memory configuration. The counters may be implemented using any appropriate counter, shift register, or similar circuitry.

In some embodiments, a separate counter or set of counters is maintained per core for each possible interference condition. In some alternative embodiments, the counter functions are combined and maintained in a reduced number of larger counters. Such counters may be segmented to maintain a count for each respective condition. Similarly, derivative values may be created for one or more of the counters. For example, each counter can be reduced to a one-bit value depending on whether the counter value exceeds a given threshold.

In some embodiments, the count value for each interference condition is assigned a weight depending on the respective interference condition, and other factors, such as a degree of excess above or below a defined threshold value. The weighting value reflects the fact that certain conditions may be more or less severe than other conditions. For example, row conflicts may result in a greater delay than the other conditions, and consequently the count associated with this condition may be assigned a higher weight than the other conditions. Alternatively, the count increment may be different for the different interference conditions. For example, row-buffer conflicts may be incremented by two for every cycle rather than once per cycle to reflect the greater impact of row-buffer contention as compared to bus contention.

For each core, an overall interference (or victimization) score can be derived by combining the scores for each of the interference events. The overall score can be a simple summed value, or it may be a weighted aggregate score. In this case, a weight is assigned to each interference condition to reflect the relative severity of each particular interference condition type. Thus the overall score can be express as:

$$S_{total} = aS_{bc} + bS_{rc} + cS_{bus} + dS_{wtr}$$

In the above equation, the overall score $S_{total}$ is the sum of the bank contention score $S_{bc}$, the row conflict score $S_{rc}$, the bus contention score $S_{bus}$, and the WTR score $S_{wtr}$, each multiplied by a respective weight value, a, b, c, and d.

The above embodiment illustrated a case where the overall score was derived by taking the sum (weighted or non-weighted) of the component scores. Alternatively, the overall score may be derived by any appropriate function that combines the individual scores in a desired manner. Such functions include multiplying the scores, dividing the scores, performing normalization or scaling of the scores, or other similar mathematical and/or combinatorial functions.

The count or scoring information generally reflects the level of interference caused or suffered by each particular core. In this manner, a consistently interfering core can be accommodated with respect to limiting performance or other measures, and/or a consistently victimized core can be strengthened to prevent delays. The count data can also be extended to track information related to interplay between particular pairs or sets of cores in the processor. For example, if a core is not particularly offensive overall with respect to causing conflict, but instead consistently delays a certain other core, then action may be warranted with respect to resolving a specific conflict situation between specific pairs or sets of cores.

Control Signals

Figure 3:
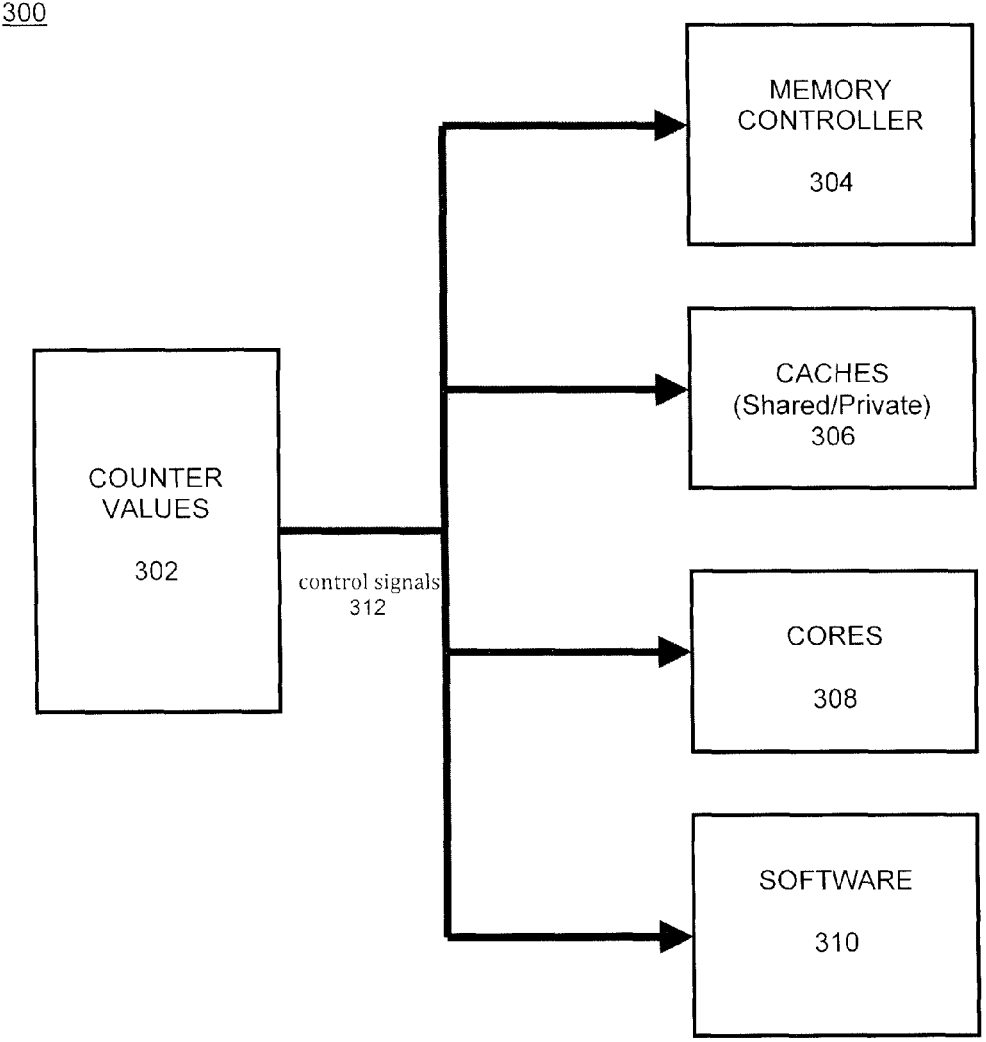
FIG. 3 illustrates the use of counter values to control one or more resources of a multi-core processing system to eliminate or reduce the effect of intercore interference, under some embodiments.

The score information is used by the monitor component within the memory controller to help dictate or modify behavior of certain components within the system to help minimize or eliminate the interference condition(s). In some embodiments, the intercore interference monitor 105 generates one or more control signals 110 to control/modify the service delivered to the offending/interfering cores. Various different resources may be controlled in an attempt to eliminate or reduce the amount of interference between the interfering cores and the victimized cores. FIG. 3 illustrates the use of counter values to control one or more resources of a multi-core processing system to eliminate or reduce the effect of intercore interference, under some embodiments. As shown in diagram 300, one or more control signals 312 are generated based on the counter values (or scores) 302. These control signals are then transmitted to one or more of the system components, including the memory controller 304, caches 306, cores 308, and/or software 310.

In some embodiments, the monitor component can provide appropriate control signals to the memory controller 304, or the memory controller itself can directly observe the counter values and correspondingly deprioritize cores that cause interference, and/or increase the priority of cores suffering from interference (victimized cores). Changing the priorities of one or more of the cores can be implemented by limiting the number of requests that an interfering core can issue per unit time, by increasing the probability of selecting a victimized core to issue a memory command, by changing the number of in-flight requests allowable per core (i.e., limiting the number of request buffer entries occupied by specific cores), or other similar mechanisms.

As shown in FIG. 3, the control signals 312 can also be used to provide notification to the shared caches 306. The values or derivative values of the various counters can be passed back to the cache hierarchy, such as either continuously through hard-wired datapaths, or on a periodically sampled basis. The cache control logic, potentially at one or more shared cache levels (e.g., L2, L3) can take this information into account when making its various arbitration decisions. For example, when multiple outstanding requests are pending in the L3 cache's miss status handling registers (MSHRs), the cache control logic can select requests from victimized cores to send to main memory before sending requests corresponding to interfering cores. Similarly, the cache control logic can throttle the rate that requests from interfering cores are sent to main memory. The cache control logic can also throttle the rate and/or aggressiveness of prefetch requests issued by the L2 and/or L3 prefetcher(s) on behalf of interfering cores.

In some embodiments, the shared caches (especially the last level cache) use the interference/victimization counter information to adjust the replacement policy (possibly including insertion and promotion decisions as well), preferentially caching lines from high-interference or, alternatively, highly-victimized cores. This mechanism can also be used to preferentially evict lines that cause low interference.

The caches 306 shown in FIG. 3 may also include private caches, and the control signals 312 can also he used to provide notification to these private caches. The values of the counters (including derivative values) can be passed to the individual core's L1 caches (likely only passing down counters corresponding to a specific core). Based on the counter value, the L1 cache control logic can throttle the rate of requests. For example, a core that causes interference at the main memory can reduce the rate of requests issued by reducing the number of MSHRs used at the L1 cache. The cache control logic can also throttle the rate and/or aggressiveness of L1 prefetch requests issued on behalf of any interfering cores.

As further shown in FIG. 3, the cores 308 themselves can also be controlled by the control signals 312. The values of the counters (including derivative values) can be passed to each of the individual cores of the processor. Cores that are causing interference at the main memory can reduce the rate of memory requests by, for example, reducing the maximum size of the load and/or store queues, reducing the aggressiveness of memory dependence speculation, reducing voltage/frequency of the core, or other similar techniques.

The control signals 312 can also be used to provide control over the software 310 that is executed by the multi-core processor. The values of the counters (including derivative values) can be passed to the system software through special hardware registers, special instructions, or by writing the counter values to memory where the system software can read the values. The system software may include the operating system, hypervisors/virtual machine managers, middleware, runtime systems, or other software. The system software can use the counter values to adjust the priorities of the different processes/applications or make different scheduling decisions, for example, by avoiding scheduling aggressive/contention-causing applications with other more easily victimized applications at the same time and/or in the same location (e.g., different sockets in a symmetric multiprocessor system (SMP), or different nodes in a rack/cluster). The system can also change the "nice" level of processes/applications. In this case, "niceness" refers to a setting that affects how likely a process will be scheduled ahead or behind other processes, such that a nice application will typically get scheduled by the operating system less often, yielding processor resources to other applications, as opposed to an "un-nice" application that will get scheduled more often and thus possibly dominate processor resources.

Embodiments of the intercore interference monitor component effectively track and assign some level of blame victimization to specific cores in the multi-core processor. Such a system provides an improvement over systems that simply try to re-balance the effects of interference, but do not account for particular causes. Such a system is also useful for identifying persistent causes of interference, such as particular cores that are consistent interferers or victims of interference. Such indications of persistent problems can help lead to solutions that are directed to specific causes of interference, rather than the effect of interference, and lead to more efficient memory operation over the long-term.

Figure 4:
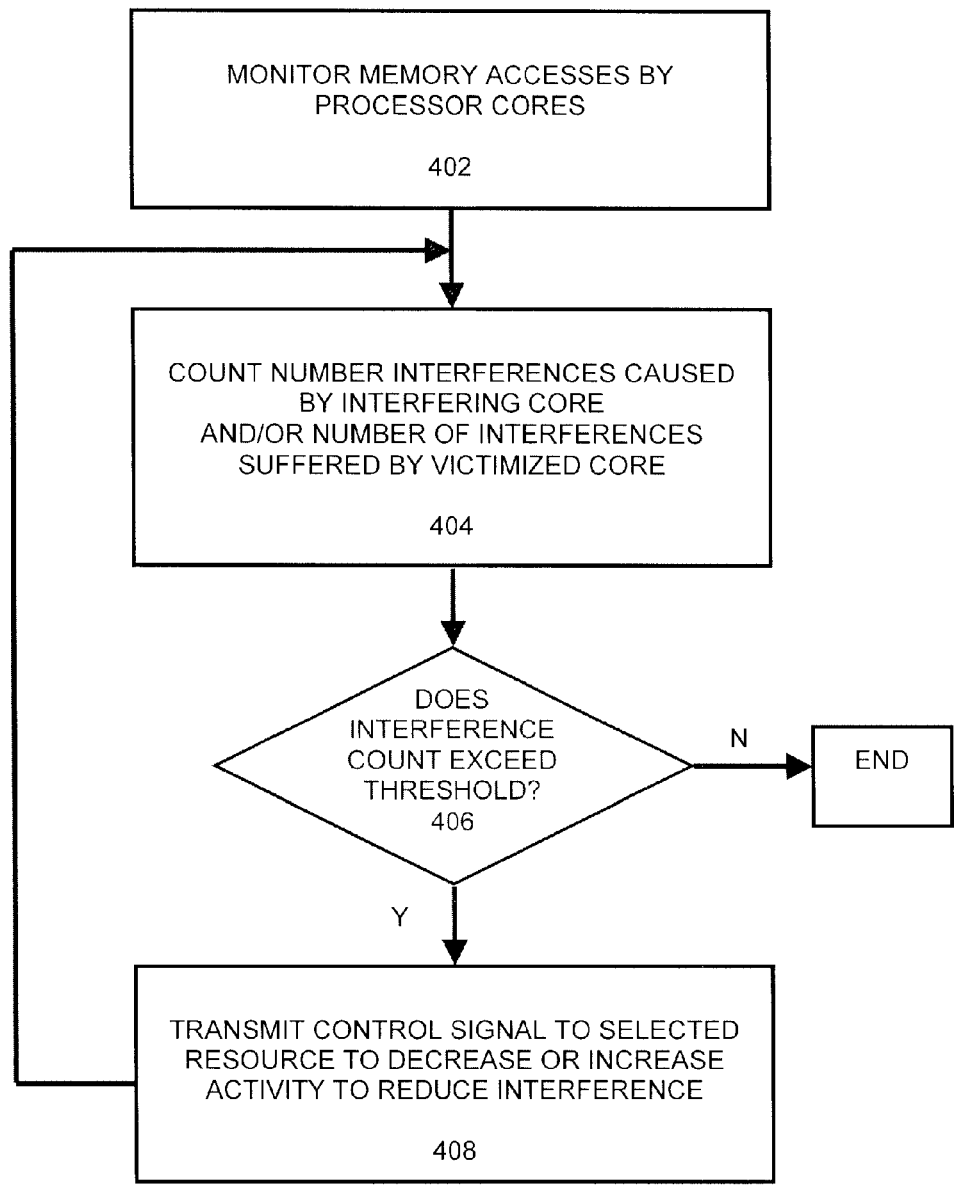
FIG. 4 is a flowchart that illustrates a method of reducing intercore interference through a memory controller, under some embodiments.

Although embodiments are described with respect to the use of counters and specific hardware circuitry, it should be noted that the functions of the intercore interference monitor 105 may be implemented through software programs, firmware, hardware circuitry, or any combination thereof. As such, the functions may be implemented at least in part in the form of a computer-implemented process performed by executing code in a processor-based system. FIG. 4 is a flowchart that illustrates a method of reducing intercore interference through a memory controller component, under some embodiments. This method constitutes an effective process of providing a cross-core attribution of contention or interference in a multi-core processing system. As shown in FIG. 4, the intercore interference monitor 105 monitors memory accesses by the processor cores, act 402. One or more counters are used to keep track of the number of interferences caused by interfering cores and/or the number of interferences suffered by victimized cores, act 404. The count values are then analyzed to determine whether or not they exceed a defined threshold, act 406. If the count values exceed the threshold, a control portion of the intercore interference monitor 105 is used to address the appropriate system resource (e.g., memory controller, cache, cores, software) to modify activity in order to reduce the interference, act 408. Once any interference counts stop exceeding the defined threshold, the process 400 ends a present iteration of the process. Process 400 may be repeated for any number of iterations depending on interference conditions occurring within the system.

Figure 5:
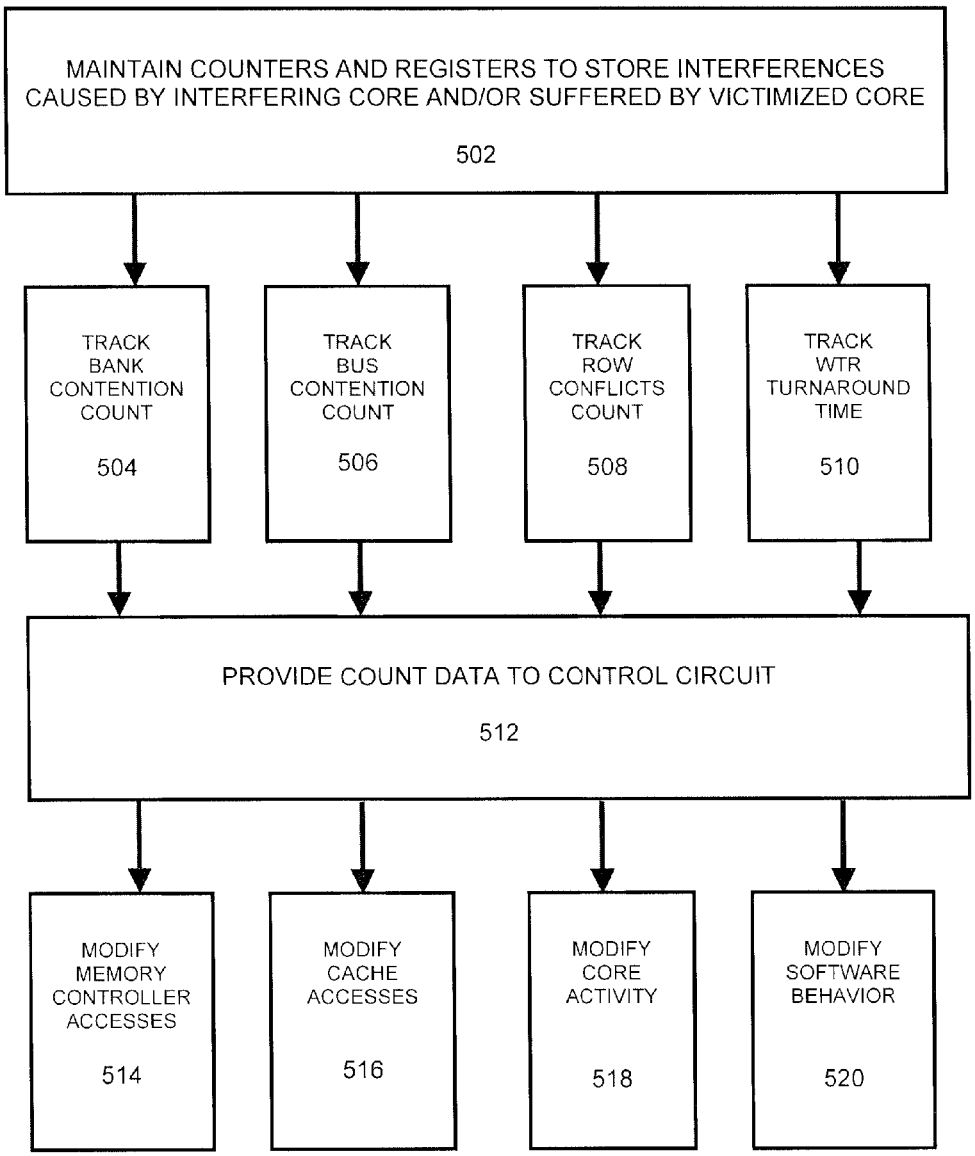
FIG. 5 is a flow diagram illustrating specific monitor and control components for the method of FIG. 4, under some embodiments.

FIG. 5 is a flow diagram illustrating specific monitor and control components for the method of FIG. 4, under some embodiments. As shown in diagram 500, the system maintains counters and registers to store counts of interference events caused by interfering cores and/or interference events suffered by victimized cores. The system separately tracks the bank contention count 504, the bus contention count 506, the row conflicts count 508, and the WTR turnaround time

510. The count data is provided to a control circuit 512, which then transmits appropriate control signals to modify memory controller accesses 514, cache accesses 516, core activity 518, and/or software behavior 520.

For the embodiment illustrated in FIG. 1, the discrete functions of monitoring instances of intercore interference for each core through counters and providing control signals to help adjust behavior of system components are shown as embodied in a single intercore interference monitor 105 within the memory controller. Alternatively, this monitor component may be provided in a module that is physically separate from the memory controller, but that is coupled to and utilized by memory control circuitry in system 100. In a further alternative embodiment, the monitoring and control functions may be provided in separate modules or circuitry. For example, the component that monitors and controls core activity 518 may be provided through circuitry provided within each core. Likewise, the cache access circuitry 516 may be within or closely associated with the caches, rather than the memory controller.

Embodiments have been described in relation to a multi-core processor embodied in a central processing unit (CPU). Such embodiments can also be implemented for use with other processing elements, such as GPUs (graphics processing units), FPU (floating point processing units), co-processors, accelerators, gate arrays, FPGAs (floating point gate arrays), and other similar processing units. Likewise, although embodiments are described in relation to a multi-core processing system, it should be noted that embodiments could also be used in any appropriate multi-processor, shared resource system, such as a multi-CPU or multi-processor system that utilizes shared memory or similar resources. Such a system may also be implemented as a multi-node architecture in a client-server network system. In this case, the term "core" can be used interchangeably with the term "node," where a node represents one of multiple processing units within unitary or distributed system that contains multiple such processing units, and wherein one node may cause or suffer interference from the activities of the other nodes.

For purposes of the present description, the terms "component," "module," "circuit," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media. Under some embodiments, the computer readable media may store program code or software instructions that are executed by a computer system and cause the computer system to perform at least some of the functions and processes of a method of reducing intercore interference through a memory controller, such as shown in process 400 of FIG. 4. Under some embodiments, the computer readable media may store program code or software instructions that are executed by a computer system and cause the computer system to configure or otherwise cause a manufacturing facility to produce an integrated circuit or circuits including any of a memory controller 104, inter-core interference monitor 105, and multi-core processor 106.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for controlling access to memory in a processor-based system, comprising:
    monitoring a number of interference events caused by a first core in the processor-based system that causes a delay in access to the memory by a second core in the processor-based system;
    deriving a control signal based on the number of interference events; and
    transmitting the control signal to one or more resources of the processor-based system to reduce the number of interference events from an original number of interference events.

2. The method of claim 1 wherein the processor-based system comprises a multi-core processor accessing shared memory through a memory controller, and wherein the one or more resources is selected from the group consisting of: memory controller elements, cache memory, one or more cores of the multi-core processor, and a software program executed by the multi-core processor.

3. The method of claim 2 wherein the interference events are associated with one or more memory access conditions selected from the group consisting of: bank contention, row conflicts, bus contention, and write-to-read (WTR) turnaround time.

4. The method of claim 3 wherein monitoring the number of interference events caused by the first core that causes a delay in access to the memory by the second core comprises maintaining a counter per core.

5. The method of claim 4, wherein the counter is selected from the group consisting of: a counter for the bank contention, a counter for the row conflicts, a counter for the bus contention, and a counter for the WTR turnaround time.

6. The method of claim 4 wherein monitoring the number of interference events caused by the first core that causes a delay in access to the memory by the second core further comprises maintaining at least one state register per core for the row conflicts.

7. The method of claim 4 further comprising:
    deriving a score based on a count for each counter per core;
    assigning a weight to each score depending on a respective memory access condition to derive an aggregate weighted count value; and deriving a total weighted score for each core by totaling the scores based on the count for each counter of the respective core.

8. The method of claim 4 further comprising:
determining if the number of interference events exceeds a first defined threshold;
monitoring a number of interference events suffered by the second core due to an interference event caused by the first core;
determining if the number of interference events exceeds a second defined threshold; and
transmitting the control signal to the one or more resources to reduce the number to interference events to a level less than one of the first defined threshold and the second defined threshold.

9. A method for attributing cross-core interference for memory accesses to specific cores in a processor-based system, comprising:
maintaining a count of the interference events in a plurality of counters associated with one or more memory access conditions, the interference events being associated with a first core in the processor-based system that impact access to the memory by a second core in the processor-based system; and
transmitting a control signal to one or more resources of the processor-based system to reduce the number of interference events to a number less than an original number of interference events.

10. The method of claim 9 wherein the interference events comprise at least one of: an interference event caused by the first core to create a delay to the access to the memory by the second core, and a delay in memory access suffered by the second core due to activity of the first core.

11. The method of claim 10 wherein the one or more memory access conditions is selected from the group consisting of: bank contention row conflicts; row conflicts; bus contention conditions; and write-to-read (WTR) turnaround time.

12. The method of claim 11 wherein the one or more resources is selected from the group consisting of: memory controller elements, cache memory, one or more cores of the multi-core processor, and a software program executed by the multi-core processor.

13. The method of claim 11 wherein the plurality of counters includes at least one counter selected from the group consisting of: a counter for the bank contention, a counter for the row conflicts, a counter for the bus contention, and a counter for the WTR turnaround time.

14. The method of claim 11 wherein maintaining the count of interference events further comprises maintaining at least one state register for the row conflicts.

15. A system for controlling access to memory in a processor-based system, comprising:
an interference monitor configured to monitor a number of interference events caused by a first core in the processor-based system that causes a delay in access to the memory by a second core in the processor-based system; and
a counter component configured to generate a control signal based on the number of interference events and transmit the control signal to one or more resources of the processor-based system to reduce the number of interference events from an original number of interference events.

16. The system of claim 15 wherein the processor-based system comprises a multi-core processor accessing shared memory through a memory controller, and wherein the one or more resources is selected from the group consisting of: memory controller elements, cache memory, one or more cores of the multi-core processor, and a software program executed by the multi-core processor.

17. The system of claim 16 wherein the interference events are associated with one or more memory access conditions selected from the group consisting of: bank contention, row conflicts, bus contention, and write-to-read (WTR) turnaround time.

18. The system of claim 17 wherein the counter component comprises:
a first plurality of counters maintaining a counter per core for the bank contention;
a second plurality of counters maintaining a counter per core and a register for the row conflicts;
a third plurality of counters a counter per core for the bus contention; and
a fourth plurality of counters a counter per core for the WTR turnaround time.

19. The system of claim 18 wherein the counter component further comprises at least one state register per core for the row conflicts.

20. The system of claim 15 wherein the interference monitor is further configured to:
determine if the number of interference events exceeds a first defined threshold;
monitor a number of interference events suffered by the second core due to an interference event caused by the first core;
determine if the number of interference events exceeds a second defined threshold; and
cause the transmission of the control signal to the one or more resources to reduce the number of interference events to a level less than one of the first defined threshold and the second defined threshold.

* * * * *